Patented Mar. 14, 1933

1,901,561

UNITED STATES PATENT OFFICE

ARTHUR LANGMEIER, OF DOVER, NEW JERSEY, ASSIGNOR TO HERCULES POWDER COMPANY, OF WILMINGTON, DELAWARE, A CORPORATION OF DELAWARE

METHOD OF DEHYDRATING NITROCELLULOSE AND THE PRODUCT THEREOF

No Drawing. Application filed May 24, 1927. Serial No. 193,954.

My invention relates to a novel method for the treatment of nitrocellulose whereby it may be dehydrated and at the same time rendered relatively uninflammable for long periods at relatively high temperatures.

My invention has for its object a method of washing nitrocellulose to effect its dehydration and to enable it to be safely stored for long periods and safely shipped over long distances and under unfavorable conditions, as in ocean shipments.

It is well known that nitrocellulose, in the process of its manufacture, is subjected to washings with water in order to remove the nitrating acids, and that while excess water may be readily removed from the nitrocellulose mechanically, as by pressing or centrifuging, a certain amount of water tenaciously clings to it and can only be effectively removed by other than mechanical means. The water not readily removed from nitrocellulose by mechanical means has heretofore been removed by the use of alcohol, as, for example, ethyl alcohol, which when percolated through a mass of nitrocellulose, from which the excess of water has been removed, acts to displace the residual water.

It is well known that nitrocellulose when in a dry condition is highly inflammable and is not only unsafe to work, but its storage or shipment, when dry, is prohibitively dangerous; at the same time it is equally well known that if the nitrocellulose is in a wet condition, that is, if the fibres be wetted with a liquid, that it is relatively non-inflammable and may be safely worked, stored, or shipped.

Now I have discovered that if nitrocellulose carrying water, that is to say damp, be washed with amyl alcohol, removal of the water, or dehydration, will be effected and if an amount of the amyl alcohol sufficient to wet the fibres of the nitrocellulose be permitted to remain in the nitrocellulose after dehydration is complete, its inflammability will be so reduced as to permit it to be stored, or shipped, over long periods and under highly unfavorable conditions.

As an illustration of the carrying out of the process embodying my invention, nitrocellulose which has been washed, and which carries a relatively large amount of water, is subjected to mechanical treatment to effect removal of excess water. For example, the nitrocellulose may be centrifuged. After the removal of the excess water, amyl alcohol, which may be commercial amyl alcohol, approximating 95%, is percolated through the mass until the residual water is removed. The percolation may be effected in a centrifuge, in a press, or in any other suitable apparatus. When the residual water is eliminated from the nitrocellulose, the excess of amyl alcohol is removed by mechanical means, as, for example, by centrifuging or pressing, the alcohol content being reduced to say within the range 20%–40% or, for example, to about 30%. When the excess of amyl alcohol has been removed, the nitrocellulose, the fibres of which are thoroughly wetted with amyl alcohol, is ready for use, storage or shipment.

The amyl alcohol, I have discovered, is of peculiar advantage in that it is an excellent dehydrating medium and subsequently acts to reduce the inflammability, or fire hazard of the nitrocellulose to a marked extent, at the same time the amyl alcohol will remain with the nitrocellulose even under relatively high temperatures, thus insuring the continuance of the wetted condition thereof for long periods. The amyl alcohol enters without disadvantage into practically all compositions of which nitrocellulose is an ingredient and in many compositions its presence is advantageous.

Having now fully described my invention, what I claim and desire to protect by Letters Patent is:—

1. The method of treating nitrocellulose, which comprises passing amyl alcohol through a mass of damp nitrocellulose for the removal of water therefrom and removing the excess of said alcohol from the mass by mechanical means.

2. The method of treating nitrocellulose, which comprises centrifuging a mass of wet nitrocellulose to remove excess water, percolating amyl alcohol through the damp mass for the displacement of residual water and finally centrifuging the mass to remove the excess of said alcohol.

3. The method of treating nitrocellulose, which comprises removing excess water from a mass of wet nitrocellulose, percolating an excess of amyl alcohol through the damp mass for the displacement of residual water, and reducing the alcohol content of the mass to within the range from about 20% to 40% by mechanical means.

4. Nitrocellulose, the fibres of which are wetted with amyl alcohol.

5. Nitrocellulose containing from about 20% to 40% of amyl alcohol substantially uniformly distributed throughout the mass.

6. The method of treating nitrocellulose, which comprises centrifuging a mass of wet nitrocellulose to remove excess water, percolating amyl alcohol through the damp mass for the displacement of residual water and finally pressing the mass to remove the excess of said alcohol.

7. Nitrocellulose wet with amyl alcohol, the product being substantially dehydrated.

8. Nitrocellulose wet with about 30% amyl alcohol, the nitrocellulose being substantially dehydrated.

In testimony of which invention, I have hereunto set my hand, at Wilmington, Del., on this 19th day of May, 1927.

ARTHUR LANGMEIER.